(12) United States Patent
Lee

(10) Patent No.: US 9,004,800 B2
(45) Date of Patent: Apr. 14, 2015

(54) ADAPTOR FOR WINDSHIELD WIPER ARM BRACKET

(75) Inventor: Albert Lee, Baltimore, MD (US)

(73) Assignee: Alberee Products, Inc., Baltimore, MD (US)

( * ) Notice: Subject to any disclaimer, the term of this patent is extended or adjusted under 35 U.S.C. 154(b) by 0 days.

(21) Appl. No.: 13/438,499

(22) Filed: Apr. 3, 2012

(65) Prior Publication Data

US 2012/0186035 A1    Jul. 26, 2012

Related U.S. Application Data

(62) Division of application No. 11/889,845, filed on Aug. 16, 2007, now Pat. No. 8,166,605.

(60) Provisional application No. 60/838,367, filed on Aug. 18, 2006.

(51) Int. Cl.
*B60S 1/40* (2006.01)
*B60S 1/38* (2006.01)

(52) U.S. Cl.
CPC ............. *B60S 1/4006* (2013.01); *B60S 1/3856* (2013.01); *B60S 1/3867* (2013.01); *B60S 1/4074* (2013.01); *B60S 1/3851* (2013.01)

(58) Field of Classification Search
CPC .... B60S 1/3856; B60S 1/3867; B60S 1/4067; B60S 1/4077; B60S 1/4074; B60S 2001/408
USPC .............. 15/250.32, 250.33, 250.43, 250.44, 15/250.31; 24/335, 336, 339, 652, 656, 24/666, 654, 563, 30.55; 403/326, 329, 403/161, 155, 154, 322, 317, 319; 411/522; D8/395, 396
See application file for complete search history.

(56) References Cited

U.S. PATENT DOCUMENTS

| | | | | |
|---|---|---|---|---|
| 895,842 | A | * | 8/1908 | Chambers ...................... 411/213 |
| 4,113,397 | A | * | 9/1978 | Snyder .......................... 403/154 |
| 4,227,759 | A | * | 10/1980 | Lee et al. ..................... 312/257.1 |
| 4,354,293 | A | * | 10/1982 | Le Sausse et al. .......... 15/250.32 |
| 4,383,350 | A | * | 5/1983 | Coty ............................... 24/669 |
| D297,616 | S | * | 9/1988 | Doty et al. ..................... D8/395 |
| 5,084,933 | A | * | 2/1992 | Buechele .................... 15/250.32 |

(Continued)

FOREIGN PATENT DOCUMENTS

| DE | 3047953 | * 11/1991 |
|---|---|---|
| DE | 19812716 | * 1/1999 |

(Continued)

*Primary Examiner* — Gary Graham
(74) *Attorney, Agent, or Firm* — Birch, Stewart, Kolasch & Birch, LLP

(57) ABSTRACT

A windshield wiper arm bracket includes a pair of side walls. Each of said side walls include at least one centrally located pin arm receiving hole formed therein. The bracket also includes a post attaching the pair of side walls together. The post is for receiving a pin arm adaptor thereon. The bracket also includes an attachment arm formed on a bottom of each of the pair of side walls. The attachment arms are for connecting the bracket to a windshield wiper assembly. An adaptor for a windshield wiper arm bracket includes a top portion and a web portion. The web portion includes a central aperture formed therein. The central aperture includes a first portion for receiving a post of the windshield wiper arm bracket and a second aperture for receiving a pin arm of a windshield wiper arm.

7 Claims, 4 Drawing Sheets

(56) References Cited

U.S. PATENT DOCUMENTS

| | | | |
|---|---|---|---|
| 5,871,189 A * | 2/1999 | Hoftman | 248/229.16 |
| 6,640,380 B2 * | 11/2003 | Rosenstein et al. | 15/250.32 |
| 7,398,577 B2 * | 7/2008 | Genet | 15/250.32 |
| 2006/0026786 A1 | 2/2006 | Ku | |
| 2007/0113366 A1 | 5/2007 | Walworth et al. | |

FOREIGN PATENT DOCUMENTS

| | | | |
|---|---|---|---|
| DE | 10251519 A1 | * | 5/2004 |
| GB | 2044082 | * | 10/1980 |
| GB | 2067068 A | * | 7/1981 |

* cited by examiner

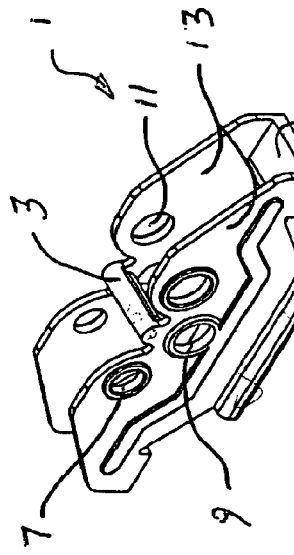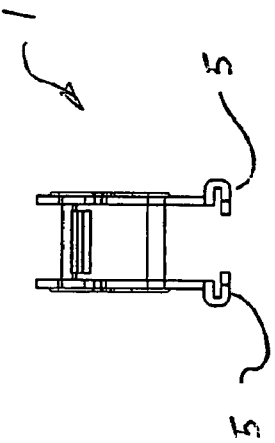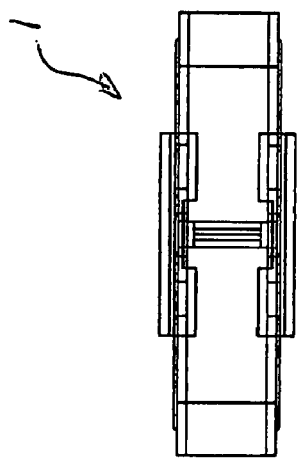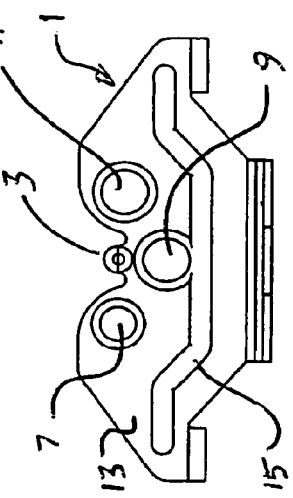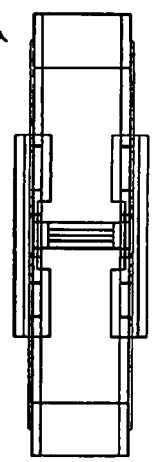

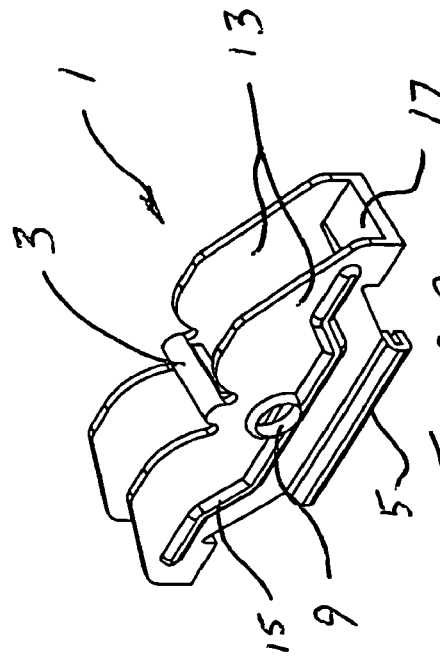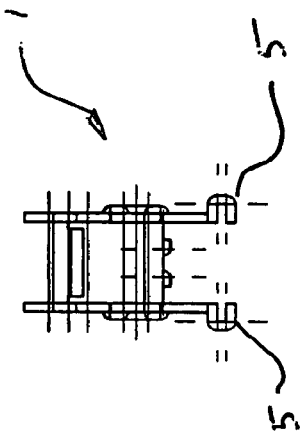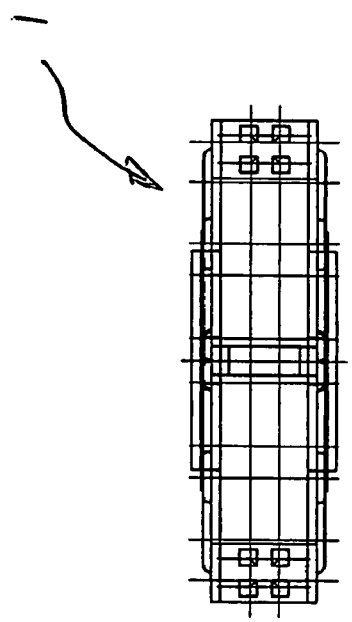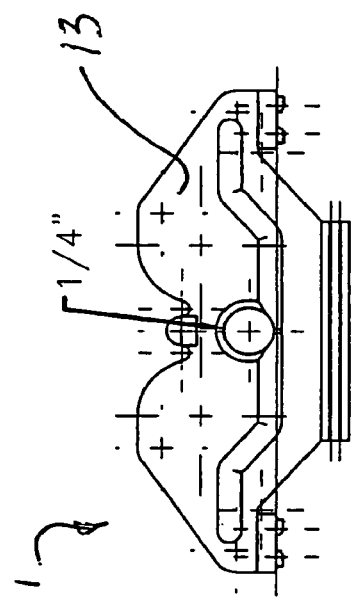

ADAPTOR FOR WINDSHIELD WIPER ARM BRACKET

CROSS REFERENCE TO RELATED APPLICATIONS

This application is a Divisional of co-pending U.S. application Ser. No. 11/889,845 filed on Aug. 16, 2007 now U.S. Pat. No. 8,166,605, which claims priority under 35 U.S.C. 119(e) to U.S. Provisional Application No. 60/838,367 filed on Aug. 18, 2006, and on which priority is claimed under 35 U.S.C. §120, the entire contents of which are hereby incorporated by reference.

BACKGROUND OF THE INVENTION

1. Field of the Invention

The present invention relates to a windshield wiper arm bracket that receives a pin arm of a windshield wiper arm. In particular, the present invention relates to a windshield wiper arm bracket that includes at least one pin arm receiving hole that is centrally located on the bracket. The present invention also relates to a bracket adaptor that secures the pin arm in the pin arm receiving hole of the windshield wiper arm bracket.

2. Description of Related Art

The windshield wiper arm bracket of the present invention can be used with the windshield wiper assembly, which is described in U.S. application Ser. No. 11/235,378 (hereinafter "the '378 Application") filed on Sep. 19, 2005 and entitled "Windshield Wiper Assembly Having a Body Made of Spring Steel." The '378 is incorporated herein by reference.

SUMMARY OF THE INVENTION

The present invention is directed to a windshield wiper arm bracket, comprising: a pair of side walls; each of said side walls including at least one centrally located pin arm receiving hole formed therein; a post attaching the pair of side walls together, said post for receiving a pin arm adaptor thereon; and an attachment arm formed on a bottom of each of the pair of side walls, said attachment arms for connecting the bracket to a windshield wiper assembly.

The present invention is also directed to an adaptor for a windshield wiper arm bracket, said adaptor comprising: a top portion; and a web portion, said web portion including a central aperture formed therein, said central aperture including a first portion for receiving a post of the windshield wiper arm bracket and a second aperture for receiving a pin arm of a windshield wiper arm.

Further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1A is a front view of a first embodiment of the windshield wiper arm bracket according to the present invention;

FIG. 1B is a perspective view of FIG. 1A;

FIG. 1C is a top view of FIG. 1A.

FIG. 1D is a bottom view of FIG. 1A;

FIG. 1E is a side view of FIG. 1A;

FIG. 2A is a front view of a second embodiment of the windshield wiper arm bracket according to the present invention;

FIG. 2B is a perspective view of FIG. 2A;

FIG. 2C is a top view of FIG. 2A

FIG. 2D is a side view of FIG. 2A;

DETAILED DESCRIPTION OF THE PREFERRED EMBODIMENTS

Figure 3A:
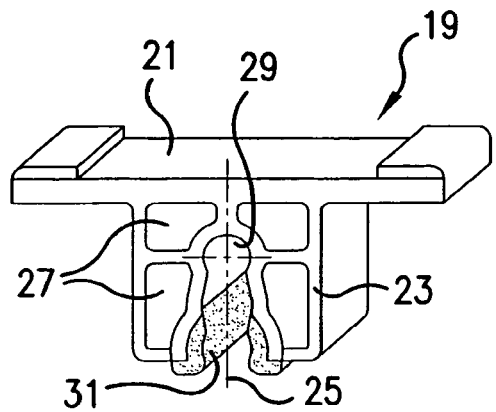
FIG. 3A is a front view of the bracket adaptor according to the present invention.
Figure 3B:
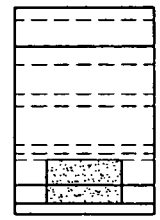
FIG. 3B is a side view of FIG. 3A.

Referring now in detail to the accompanying drawings, the preferred embodiments of the present invention will be described. Referring to FIGS. 1A to 1D, a first embodiment of the windshield wiper arm bracket of the present invention will be described.

Referring to FIG. 1A, a windshield wiper arm bracket 1 is mountable to the outside of spring steel elements (not shown) of a windshield wiper assembly (for example, the windshield wiper assembly described in the '378 Application). For example, the bracket 1 can be attached to the spring steel elements by crimping attachment arms 5 over the outside of the spring steel elements. The spring steel elements can include apertures formed therein for receiving the crimped attachment arms 5 in order to ensure a good connection between the spring steel elements and the bracket 1.

Referring to FIG. 1B, the bracket 1 is illustrated in perspective view. The bracket 1 can also be mounted to the spring steel elements by cut-outs (not shown) formed in the spring steel elements in the same manner described in the '378 Application with reference to FIGS. 3 and 15 of the '378 Application. The bracket 1 would include tabs (not shown) that would be received inside the cut-outs to attach the bracket 1 to the spring steel elements.

Other ways of connecting the bracket 1 to the spring steel elements will be readily apparent to one having ordinary skill in the art.

The windshield wiper arm bracket 1 would include an adapter (not shown) attached thereto by a post 3, so that the windshield wiper arm bracket 1 can be removably connected to a windshield wiper arm (not shown). An adaptor according to the present invention will be further described with reference to FIGS. 3A to 3D.

Referring again to FIG. 1A and 1B, the bracket 1 includes three pin arm receiving holes 7, 9 and 11 formed in side walls 13 of the bracket 1. Each of the holes 7, 9 and 11 is of a different size to receive a pin arm of a wiper arm. The holes 7 and 11 would be for receiving a 3/16 or 1/4 inch pin arm, respectively, and would cooperate with an adaptor to secure the pin arm to the bracket 1. The hole 9 would be of sufficient size to receive either a 3/16 or 1/4 inch pin arm and would cooperate with the adaptor of the present invention. The adaptor of the present invention will enable different sized pin arms to be secured through the same pin arm receiving hole. In view of this, it is not necessary for the bracket 1 of the present invention to include the holes 7 and 11. Such an embodiment will be described below with reference to FIGS. 2A to 2D.

The bracket 1 of the present invention also includes a rib 15 formed in each of the side walls 13 in order to increase the rigidity of the bracket 1. The bracket 1 is preferably formed from a single piece of sheet metal that is stamped to form the holes 7, 9 and 11 and the shape of the bracket 1. The stamped sheet metal is then bent into its final form so that the walls 13 are connected to each other by the post 3. In addition, the walls 13 are connected to each other by the webs 17 on opposite ends of the walls 13. The webs 17 can be formed by two overlapping pieces of the sheet metal. The two overlapping pieces have apertures formed therethrough and a top piece of the sheet metal is stamped through the bottom piece of the sheet metal to crimp the two pieces together and thereby form a rigid web 17.

Figure 4A:
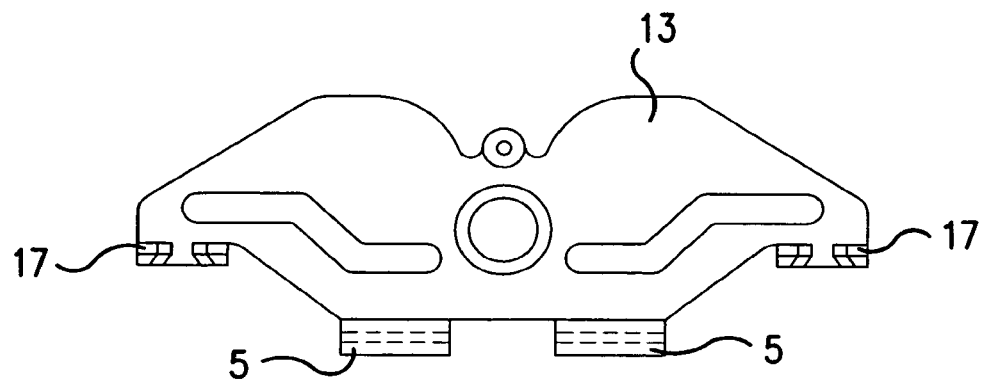
FIGS. 4A and 4B are a plurality of views of an embodiment similar to the second embodiment.
Figure 4B:
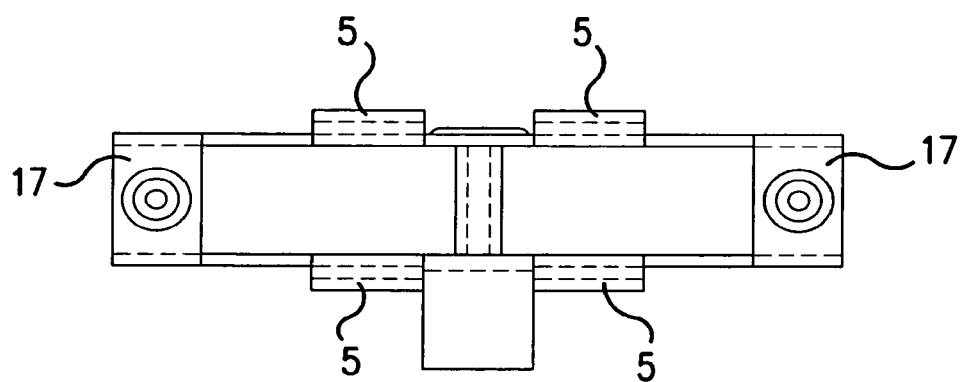

FIG. 4 of the present invention can be reviewed for an understanding of the construction of the bracket 1 of the present invention, especially the overlapping pieces of sheet metal to form the webs 17. It should be noted that FIG. 4 illustrates the second embodiment of the windshield wiper arm bracket of the present invention; however, one having ordinary skill in the art would readily recognize that the first embodiment would be the same, except that the holes 7 and 11 would also be included in the walls 13. Further, as shown in FIG. 4B, the second embodiment of the windshield wiper arm bracket may include four attachment arms 5, two on each side of the windshield wiper arm bracket.

Referring to FIGS. 2A-2D, the second embodiment of the present invention will be described. The second embodiment is the same as the first embodiment, except that only the hole 9 is included in the walls 13. As mentioned above with regard to the first embodiment, the holes 7 and 11 are not required, since the hole 9 can be used with the adaptor of the present invention to secure pin arms of different sizes to the bracket 1. However, the holes 7 and 11 can be provided as in the present invention, so that the same bracket 1 can be used with a plurality of different types of adaptors (including the adaptor or the present invention).

Referring to FIGS. 3A to 3D of the present invention, the adaptor 19 of the present invention will be described. The adaptor 19 is preferably constructed of an injection molded plastic material; however, other methods of making the adaptor 19 will be readily understood to one having ordinary skill in the art.

The adaptor 19 includes a top wall 21 and a web portion 23. The web portion 23 includes a central aperture 25 and four side apertures 27. The side apertures 27 decrease the amount of material required to manufacture the adaptor 19, while not reducing the strength of the web portion 23. The central aperture 25 includes a first semi-circular portion 29 and a second partial circular portion 31. The portion 29 is of a size to snap on the post 3 of the bracket 1 and the portion 31 is of a size to snap on a pin arm 4 of a windshield wiper arm. Since the adaptor 19 is made of a plastic material and the web portion 23 is provided, the central aperture 25 is sufficiently flexible to snap of a pin arm 4 of various sizes. For example, the adaptor 19 could be used with a pin arm of 3/16 inch or a pin arm of 1/4 inch. Of course, instead of using a single adaptor to attach different pin arms 4, it would also be possible to use adaptors that have a portion 31 made of a size that corresponds to the pin arm to be used.

Figure 3C:
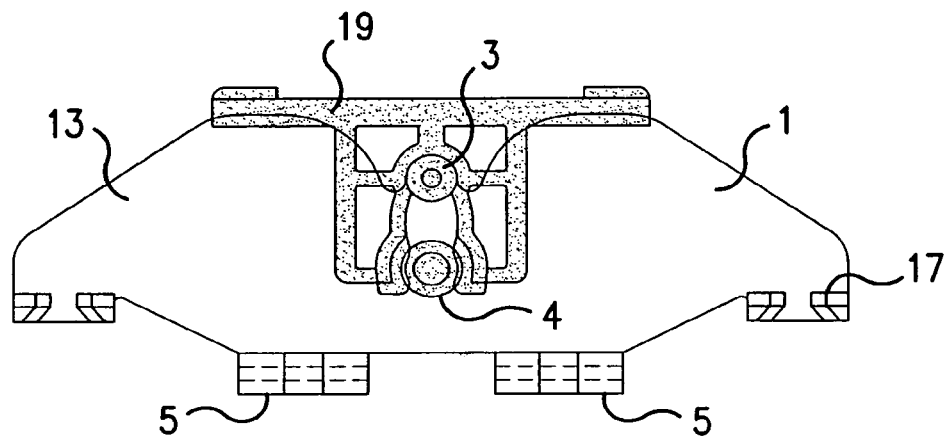
FIG. 3C is a front view of the bracket adaptor of the present invention secured to the second embodiment of the windshield wiper arm bracket of the present invention.

Referring to FIG. 3C, the adaptor 19 is illustrated in the mounted position to a bracket 1 according to the second embodiment of the present invention. The post 3 is received in the portion 29 and the pin arm 4 is received in the portion 31 of the central aperture 29 of the adaptor 19. As will be understood to one having ordinary skill in the art, the adaptor 19, when in the mounted position, will prevent rotation due to the two (2) attachment points between the adaptor 19 and the post 3 and pin arm 14.

Figure 3D:
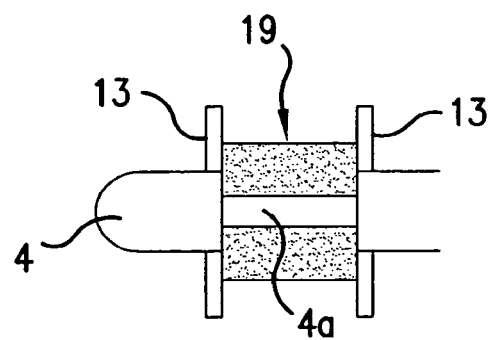
FIG. 3D is a partial bottom view of FIG. 3C.

Referring to FIG. 3D, a bottom partial view of the pin arm 4 being received in the central aperture 25 is illustrated. As can be understood from this figure, the pin arm 4 includes a narrow portion 4a that is received within the portion 31 of the central aperture 25 to secure the bracket 1, pin arm 4 and adaptor 19 together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adaptor for a windshield wiper arm bracket, said adaptor comprising:

a top portion; and a web portion, said web portion including a central aperture formed therein, said central aperture including a first portion configured to retain a post of the windshield wiper arm bracket and a second portion configured to retain a pin arm of a windshield wiper arm, wherein the top portion is a wall that extends in a direction perpendicular to the web portion, wherein the top portion has a top surface and a bottom surface that are parallel, and the web portion has a side surface, wherein the bottom surface of the top portion and the side surface of the web portion are perpendicularly connected whereby the web portion extends away from the bottom surface, and the top portion and the web portion form a T-shaped configuration, wherein the first portion defines an arc of a first imaginary circle, the second portion defines an arc of a second imaginary circle, the first imaginary circle is disposed below the second imaginary circle and the first and second imaginary circles do not overlap, and wherein the web portion comprises a plurality of hollow chambers.

2. The adaptor of claim 1, wherein the web portion is made of an elastic material so as to retain a pin arm of various sizes.

3. The adaptor of claim 1, wherein the first portion and the second portion are connected.

4. The adaptor of claim 1, wherein a length of the top portion measured in the direction is greater than a length of the web portion measured in the direction.

5. The adaptor of claim 1, wherein the first and second portions of the central aperture are aligned to extend perpendicularly away from the top and bottom surfaces of the top portion so that the top and bottom surfaces of the top portion form another T-shaped configuration with the first and second portions of the central aperture.

6. The adaptor of claim 1, wherein the first portion is configured to snap on to the post.

7. The adaptor of claim 1, wherein the second portion is configured to snap on to the pin arm.

* * * * *